(12) United States Patent
Jefferson et al.

(10) Patent No.: US 10,719,585 B2
(45) Date of Patent: Jul. 21, 2020

(54) COMPOSITE DOCUMENT ACCESS (71) Applicant: HEWLETT-PACKARD DEVELOPMENT COMPANY, L.P., Houston, TX (US)

(72) Inventors: Lorri J Jefferson, Houston, TX (US); Valiuddin Ali, Houston, TX (US); Helen Balinsky, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 215 days.

(21) Appl. No.: 15/309,480

(22) PCT Filed: Jul. 8, 2014

(86) PCT No.: PCT/US2014/045830
§ 371 (c)(1),
(2) Date: Nov. 8, 2016

(87) PCT Pub. No.: WO2016/007144
PCT Pub. Date: Jan. 14, 2016

(65) Prior Publication Data
US 2017/0185754 A1 Jun. 29, 2017

(51) Int. Cl.
G06F 21/10 (2013.01)
G06F 21/62 (2013.01)
(Continued)

(52) U.S. Cl.
CPC .............. G06F 21/10 (2013.01); G06F 16/93 (2019.01); G06F 21/44 (2013.01);
(Continued)

(58) Field of Classification Search
CPC .............. H04L 9/12; H04L 9/32; G06F 21/10
See application file for complete search history.

(56) References Cited

U.S. PATENT DOCUMENTS 6,978,366 B1 * 12/2005 Ignatchenko ....... G06F 21/6218
713/165
7,610,345 B2 10/2009 Collins et al.
(Continued)

FOREIGN PATENT DOCUMENTS

CN 1912885 B 12/2010
EP 1923814 5/2008
(Continued)

OTHER PUBLICATIONS

Fiery Fs100/fs100 Pro; http://w3.efi.com/~/media/Files/EFI/Fiery/Fiery%20Digital%20Print%20Servers/Fiery_FS10 41 pages.

Primary Examiner — Lynn D Feild
Assistant Examiner — Viral S Lakhia
(74) Attorney, Agent, or Firm — HP Inc. Patent Department (57) ABSTRACT

According to one example, a method is described for accessing a composite document in which a trigger is received. A handling instruction for a content-part, from a composite document, and a status for the content-part, from a second computer, are retrieved. An action for the content-part is determined based on the handling instruction and the status, and the content-part action is executed. In the event that the content-part action is to revoke the content-part, the content-part is revoked. In the event that the content-part action is to synchronize the content-part, the content-part is synchronized.

14 Claims, 4 Drawing Sheets (51) Int. Cl.
*G06F 16/93* (2019.01)
*G06Q 10/10* (2012.01)
*G06F 40/10* (2020.01)
*G06F 40/166* (2020.01)
*G06F 21/44* (2013.01)

(52) U.S. Cl.
CPC .......... *G06F 21/6218* (2013.01); *G06F 40/10* (2020.01); *G06F 40/166* (2020.01); *G06Q 10/10* (2013.01); *G06F 2221/0704* (2013.01)

(56) References Cited

U.S. PATENT DOCUMENTS

| | | | | |
|---|---|---|---|---|
| 8,234,640 | B1* | 7/2012 | Fitzgerald | G06F 21/53 |
| | | | | 718/1 |
| 8,346,739 | B1* | 1/2013 | Hatton | G06F 16/93 |
| | | | | 707/694 |
| 8,392,699 | B2 | 3/2013 | Jones et al. | |
| 8,453,234 | B2* | 5/2013 | Dawson | H04L 43/00 |
| | | | | 713/188 |
| 8,468,351 | B2* | 6/2013 | Boesgaard Sorensen | |
| | | | | G06F 21/55 |
| | | | | 713/168 |
| 8,548,992 | B2* | 10/2013 | Abramoff | G06F 16/904 |
| | | | | 707/726 |
| 8,634,810 | B2 | 1/2014 | Barkie et al. | |
| 9,047,441 | B2* | 6/2015 | Xie | G06F 21/00 |
| 9,772,737 | B1* | 9/2017 | Killalea | G06F 3/048 |
| 10,353,724 | B2* | 7/2019 | Fitzgerald | G06F 9/45558 |
| 2002/0186676 | A1 | 12/2002 | Milley et al. | |
| 2006/0075228 | A1 | 4/2006 | Black et al. | |
| 2006/0271603 | A1 | 11/2006 | Razvan | |
| 2008/0201440 | A1 | 8/2008 | Shah et al. | |
| 2010/0105423 | A1 | 4/2010 | Gupta | |
| 2012/0110515 | A1* | 5/2012 | Abramoff | G06F 16/904 |
| | | | | 715/854 |
| 2012/0272063 | A1 | 10/2012 | Meehan et al. | |
| 2013/0031366 | A1* | 1/2013 | Simske | H04L 9/0825 |
| | | | | 713/168 |
| 2013/0218829 | A1* | 8/2013 | Martinez | G06F 21/6272 |
| | | | | 707/608 |
| 2013/0219458 | A1* | 8/2013 | Ramanathan | G06F 21/60 |
| | | | | 726/1 |
| 2013/0247045 | A1* | 9/2013 | Fitzgerald | G06F 9/455 |
| | | | | 718/1 |
| 2014/0032913 | A1* | 1/2014 | Tenenboym | H04L 9/321 |
| | | | | 713/176 |
| 2014/0082717 | A1* | 3/2014 | Kang | G06F 21/00 |
| | | | | 726/9 |
| 2014/0101437 | A1* | 4/2014 | Kube | H04L 63/102 |
| | | | | 713/155 |
| 2014/0304762 | A1* | 10/2014 | Puri | G06F 21/10 |
| | | | | 726/1 |
| 2015/0006474 | A1* | 1/2015 | Halder | G06F 16/93 |
| | | | | 707/608 |
| 2015/0007350 | A1* | 1/2015 | Gudipati | G06F 21/54 |
| | | | | 726/30 |
| 2015/0036173 | A1* | 2/2015 | Tecu | G06F 3/1275 |
| | | | | 358/1.15 |
| 2015/0269357 | A1* | 9/2015 | Taneja | G06F 21/10 |
| | | | | 726/29 |
| 2015/0271158 | A1* | 9/2015 | Ronca | H04L 9/0819 |
| | | | | 713/168 |
| 2015/0325629 | A1* | 11/2015 | Oooka | H01L 51/525 |
| | | | | 257/40 |
| 2015/0379244 | A1* | 12/2015 | Pathak | G06F 21/10 |
| | | | | 726/28 |
| 2016/0019278 | A1* | 1/2016 | Jadhav | H04L 67/1095 |
| | | | | 707/624 |

FOREIGN PATENT DOCUMENTS

KR  10-2008-0005785   1/2008
KR  10-2014-0055071   5/2014

* cited by examiner

COMPOSITE DOCUMENT ACCESS

BACKGROUND

The creation, distribution, and exchange of digital documents has become a commonly accepted alternative to printing documents, both for purposes of efficiency and for environmental purposes, Examples of digital documents that may be created, distributed, or otherwise exchanged include, for instance, electronic word processing documents, electronic spreadsheets, electronic presentations, electronic drawings, portable document format (PDF) files, and web pages, e.g., HTML, CSS, or other web format files. Digital documents may be confidential or highly confidential, and in some cases users may wish to control the distribution of such documents.

Many digital documents have become a mixture, or a composite, of separate parts created in differing file formats. Different parts may be combined together through various serialization mechanisms such as a ZIP archive or TAR archive. One example of a composite document is a business proposal document including product images as JPEG files, a marketing video clip as a MOV file, a PowerPoint presentation as a PPT file, and a financial details spreadsheet as an XLS file. Composite documents may be presented to a user through specialized software as a single editable, browsable, searchable, approvable, or usable document.

DETAILED DESCRIPTION

In an example, a composite document, an authoring environment, and a workflow participant access environment with a trusted access tool/module provide for the access, modification, synchronization, and revocation of secure content-parts of a composite document.

More specifically, in an example, composite document access enables a composite document or composite document content-part to be revoked and/or modified based on a set of handling instructions or status identifiers. Revoking a content-part, for example, may allow a document author to revoke access to a content-part prior to it being read by a workflow participant (or "user") based on a time or event-based attribute. Revoking a content-part, in some examples, may also allow a document author to revoke access to a content-part after it has been read by a workflow participant (or "user") based on a time or event-based attribute.

Modifying a content-part, as another example, may allow a document author to modify a content-part prior to it being read by a workflow participant, or after it has been read, by synchronizing the content-part with an updated or versioned content-part.

In some examples, revoking or modifying a content-part may provide for content-part or document sanitization, providing for an increased sense of security and/or privacy. Revocations or modifications in such cases may transpire even after transmission of a content-part, or after a content-part has been read. Modifying a content-part, in some examples, may also ensure that a participant in a workflow is working from the latest version.

In either the case of revoking or modifying a content-part, a document author may be provided with an opportunity to make changes or revocations "at the last-minute," i.e., to revoke or modify content-parts of a composite document that have already been transmitted or even opened and/or read.

Figure 1:
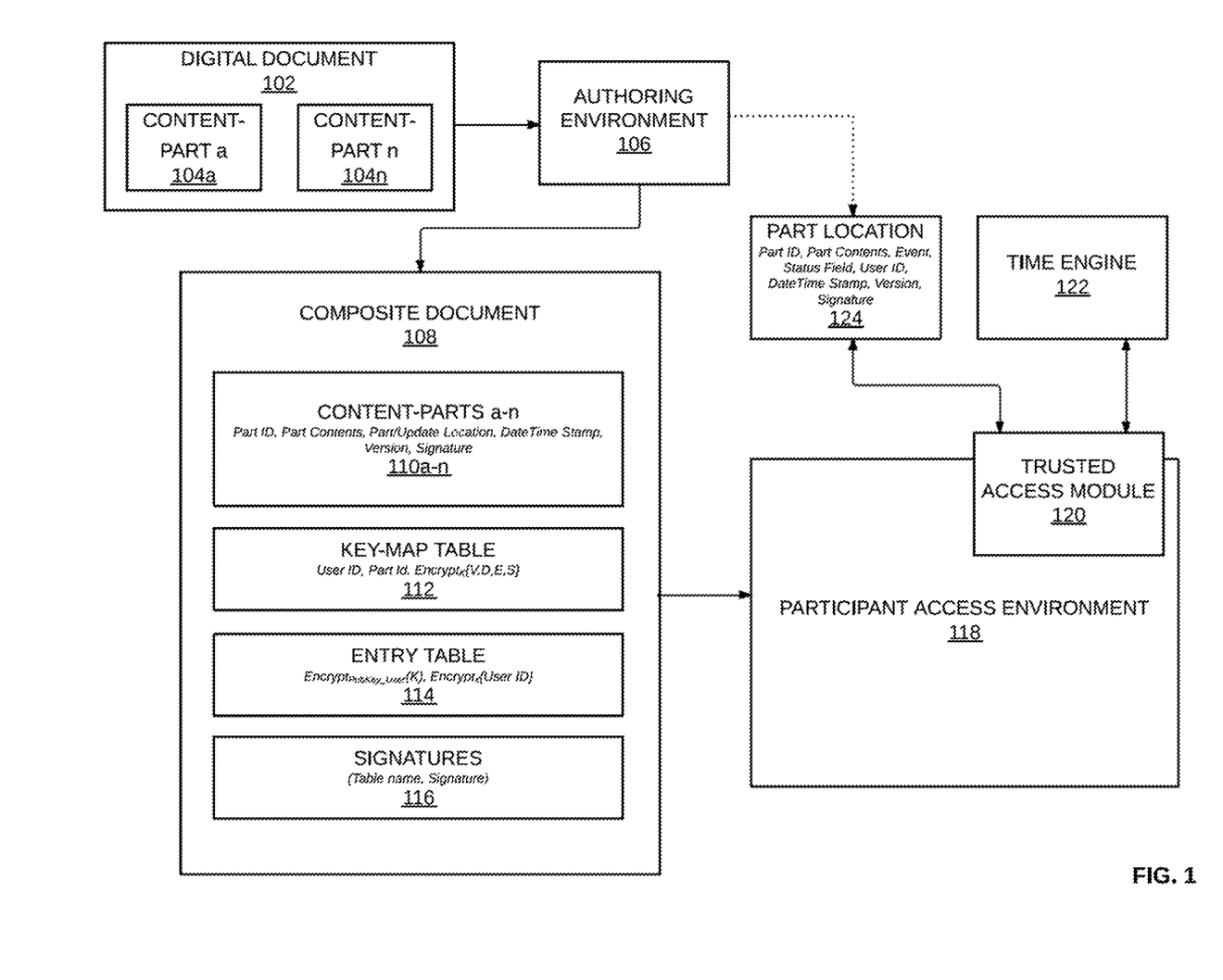
FIG. 1 illustrates a simplified block diagram of a digital document workflow, according to an example of the present disclosure.

FIG. 1 illustrates a simplified block diagram of a digital document workflow, according to an example of the present disclosure. It should be understood that the diagram depicted in FIG. 1 represents a generalized illustration and that other components may be added, or existing components may be removed, modified, or rearranged without departing from the overall scope of the digital document workflow 100.

The digital document workflow 100, in an example, includes a digital document 102, an authoring environment 106, a composite document 108, a participant access environment 118, a trusted access tool/module 120, and a time engine 122.

As discussed in more detail below, authoring environment 106, participant access environment 118, trusted access tool/module 120, and time engine 122 may comprise hardware devices such as computers, servers, databases, processors, memory, and/or circuits, etc, configured with machine readable instructions to perform various functions in the digital document workflow 100. In addition, or alternatively, the components may comprise machine-readable instructions stored on computer-readable media.

In an example, authoring environment 106 may package, encrypt, and sign the content-parts 104a-n of digital document 102 such that resulting secure content-parts 110a-n (in master form) in a composite document 108 may not be accessed unless workflow participants have the appropriate keys to access the secure content-parts 110a-n (in distribution form). More specifically, authoring environment 106 may generate, or derive, needed encryption and signature keys to encrypt and sign the content-parts 104a-n into secure content-parts 110a-n. Moreover, in an example, workflow participants may be required to use different sets of keys to read and/or write to composite document 108.

In addition, authoring environment 106 may allow for the creation or editing of handling instructions, status fields, or other attributes for accessing, modifying, or revoking content-parts in composite document 108. In examples, handling instructions or statuses may be embedded into content-parts 110a-n, or may be stored external to composite document 108 such as in an external database with a reference identifier. The external database may be a flat-file or a relational database to minimize duplication of data, and may be co-located with, for example, content-parts at a content-part location, discussed in more detail below. The handling instructions and statuses may be encrypted such that they may not be read without secure access, or only read and/or executed by a trusted access tool/module.

In an example where the handling instructions are stored in content-parts 110a-n, the content-parts table 110a-n may comprise fields such as a part ID for the content part, the content-part data (or a reference to externally stored content), an update location to link to content updates at a content-part location, a datetime stamp, and a signature. In some examples, the update location or the datetime stamp, alone or in combination with a status field, may be considered handing instructions.

Composite document 108 may comprise a digital document that contains content-parts that may have been encrypted and signed to substantially prevent unauthorized access and/or modification to the content-parts. The content-parts may comprise a variety of individually addressable and accessible parts in the form of separate files or addressable file fragments. For example, the content-parts may include individual files, groups of files, or file fragments including, e.g., tags, nodes, elements, pages, cells, slides, images, videos, etc., and/or combinations of different types of file parts.

In one example, a composite document may be publicly-posted, e.g., at a public location or on a public server, or with a public level of access. For example, a composite document may be on a public server but not be publicly accessible, or vice versa. In another example, a composite document may be used privately or internally within an enterprise, and/or in mixed workflows (inter or intra-organization).

In one example, workflow participants may be provided with initial/high-level access to a composite document without the need to retrieve or process handling instructions by, e.g., a trusted access tool. For example, a workflow participant may be presented with a Table of Contents for a composite document, but require handling instructions processed by a trusted access tool to access the content-parts represented or referenced by the Table of Contents.

Composite document 108 is depicted as containing an exemplary plurality of secure content-parts 110a-n and an exemplary plurality of encrypted key-map entries in a key map table 112. As used herein, the term "secure" is intended to denote that the content-parts 110a-n and the key-map entries in the key map table are encrypted and/or signed. Access to secure content-parts 110a-n by workflow participants may be controlled through distribution of various sets of keys contained in respective key-map entries in key map table 112 for the workflow participants.

Data stored in entry table 114 may comprise information needed to decrypt key-map entries to access secure content-parts of composite document 108. Signatures table 116 may comprise signatures of tables in a composite document 108, e.g., the signatures of an entry table 114 and/or key map table 112. As mentioned above, the various secure content-parts and composite document elements may be combined together through various serialization mechanisms, e.g., SQLite.

Participant access environment 118 may represent an exemplary computing device or software program through which workflow participants receive or initially access a composite document 108, or from which content-parts may be modified or revoked by a document author. The computing devices may comprise, for instance, personal computers, desktop computers, laptop computers, tablet computers, personal digital assistants, cellular telephones, smartphones, and consumer electronic devices, etc. The software program may comprise or include a front-end software tool or graphical user interface ("GUI") for accessing a composite document 108. When granted sufficient access, workflow participants may view, edit, copy, print, and/or acknowledge receipt of a composite document 108 through a participant access environment 118.

During the workflow 100, in an example, participant access environment 118 may receive a composite document containing one or more key-map entries for each workflow participant in which the key-map entry has been encrypted using a key K of each workflow participant. In addition, participant access environment 118 may decrypt the encrypted key-map entry using a key. In an example, the key may be a secret, symmetric encryption key for both encryption and decryption. In an example, the composite document or a content-part may also be authenticated before decryption.

Participant access environment 118 may also authenticate a participant; function as a document security and safety checkpoint; backup the composite document 108 at various points along the workflow; timestamp the composite document 108 at various points along the workflow; and scan composite document 108 to determine if composite document 108 is in compliance with security rules.

Composite document 108 may be supplied to and among workflow participants through, for instance, unsecured e-mail, a shared server, direct file transfer, removable storage media, or a cloud service, etc. Composite documents may then be stored on a workflow participant device, under the control of a workflow participant.

In an example, participant access environment 118 also comprises a trusted access module 120 trusted by a document author to guarantee timely or event-based execution of a command, e.g., revocation and/or synchronization command.

Trusted access tool 120 may be part of participant access environment 118, or may be a separate module, program, logic, or hardware. In an example, trusted access tool 120 may be run as software, a service, or a combination of software and services accessible by workflow participants on participant devices, e.g., laptops, desktops, or other devices. In an example, trusted access tool 120 may have its own key that may be used to release an access token to a workflow participant's key-map entries that are inaccessible until the access token is released.

During the workflow 100, in an example, trusted access tool 120 may receive an update location and a datetime stamp from, e.g., the content-parts table 110a-n of composite document 108. As discussed below in more detail, the update location and the datetime stamp may be used alone, or in combination with another handling instruction or a status field, to control the accessing, modifying, and/or revocation of a content-part. A time engine 122, which may be a time source, e.g., a internet clock or atomic clock, may also be used in combination with, e.g., a datetime stamp.

Part location may be, e.g., an external server with updated content-parts, referenced resource locations, handling instructions for content-parts, and/or status fields for content-parts. In some examples, participant access environment 118 or trusted access tool 120 may access part location 124. In other examples, authoring environment 106 may access part location 124. As discussed above, a part ID or other unique identifier may be used to identify a content-part. Trusted access module 120 may authenticate any or all of the data stored at part location 124, e.g., trusted access module 120 may authenticate a handling instruction or status field prior to determining an action based on the handling instruction and/or status field.

Figure 2:
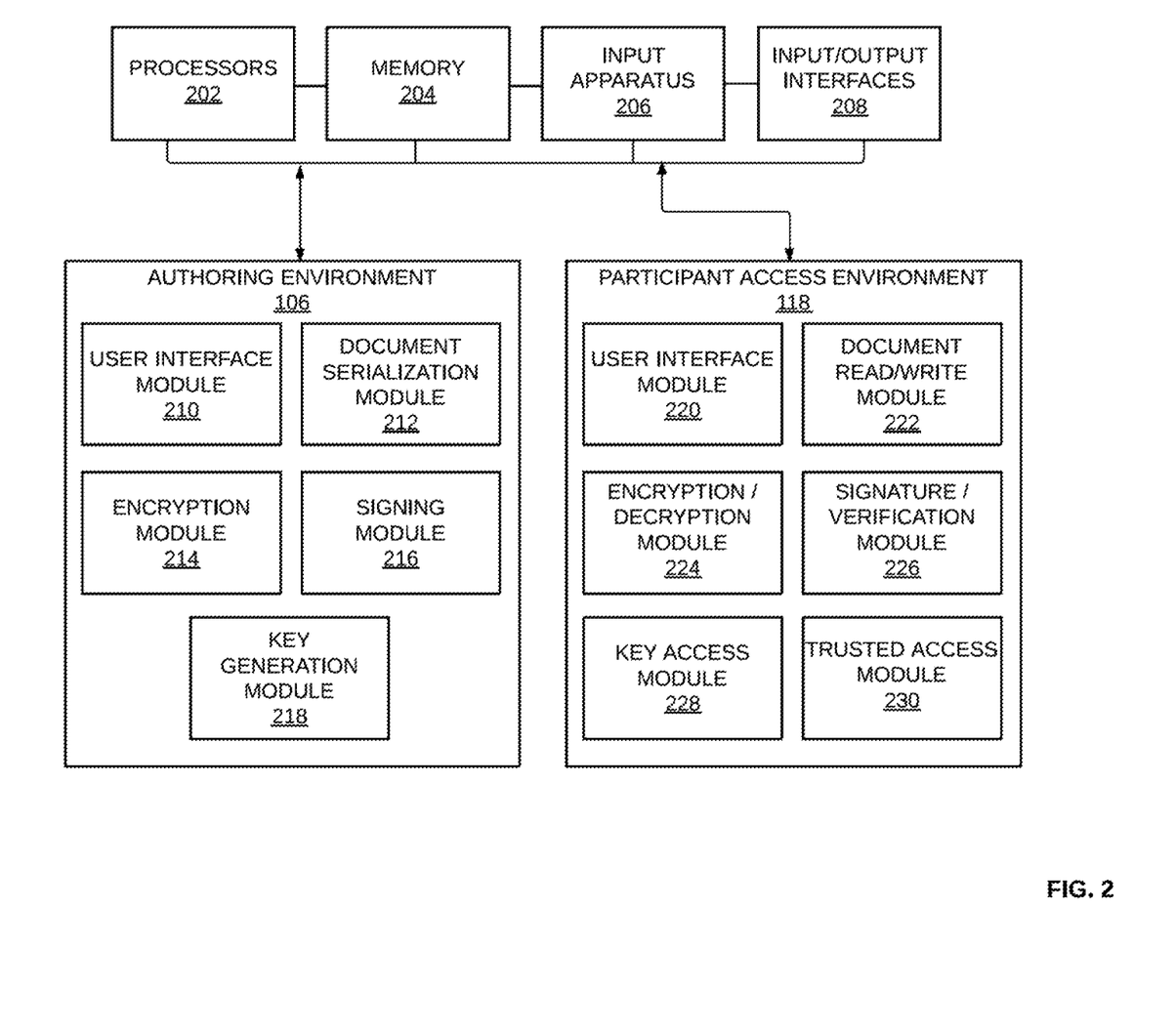
FIG. 2 illustrates a simplified block diagram of a digital document system including an authoring environment and a participant access environment, according to an example of the present disclosure.

FIG. 2 illustrates a simplified block diagram of a digital document system including an authoring environment and a participant access environment 118, according to an example of the present disclosure.

It should be understood that the block diagram depicted in FIG. 2 represents generalized illustrations and that other components may be added, or existing components removed, modified, or rearranged, without departing from the scope of the systems of FIG. 2.

As shown in FIG. 2, authoring environment 106 may include, in an example, a user interface module 210, a document serialization module 212, an encryption module 214, a signing module 216 and a key generation module 218. Aside from the other operations of an authoring environment, the modules may support a user interface, adding (or "serializing") content parts into a composite document, encrypting content-parts or an entire composite document, signing content-parts or an entire composite document, and generating keys for use in a composite document.

Participant access environment 118 may include, in an example, a user interface module 220, a document read/write module 222, an encryption/decryption module 224, a signature/verification module 226, a key access module 228, and a trusted access module 230. Aside from the other operations of a participant access environment 118, including those discussed herein, the modules may support a user interface, reading and/or writing content-parts, encrypting and decrypting content-parts, signing or verifying content-parts, accessing keys, and providing for trusted access, as discussed above with respect to trusted access module 230.

The modules 210-218 and 220-230 may represent machine readable instructions, logic, hardware, or a combination of modules containing machine readable instructions and hardware. Thus, in one example, at least one of the modules 210-218 and/or 220-230 comprise circuit components. In another example, at least one of the modules 210-218 and/or 220-230 comprise machine readable instructions stored on a computer readable storage medium, which is executable by a processor.

The authoring environment 106 and participant access environment 118 may be implemented and/or executed by a respective processor or processors 202, which may be coupled to memories 204, input apparatus 206, and input/output interfaces 208. As an example, the participant access environment 118 may comprise a computer readable storage device upon which machine readable instructions for each of the modules 220-230 are stored and executed by a processor 202, which may be coupled to a memory 204.

The authoring environment 106 and participant access environment 118, and/or other modules such as trusted access tool 120, may communicate directly with each other, or through input/output interfaces, e.g., interfaces 208, or through the use of tokens or keys or other means of digital communication.

Figure 3:
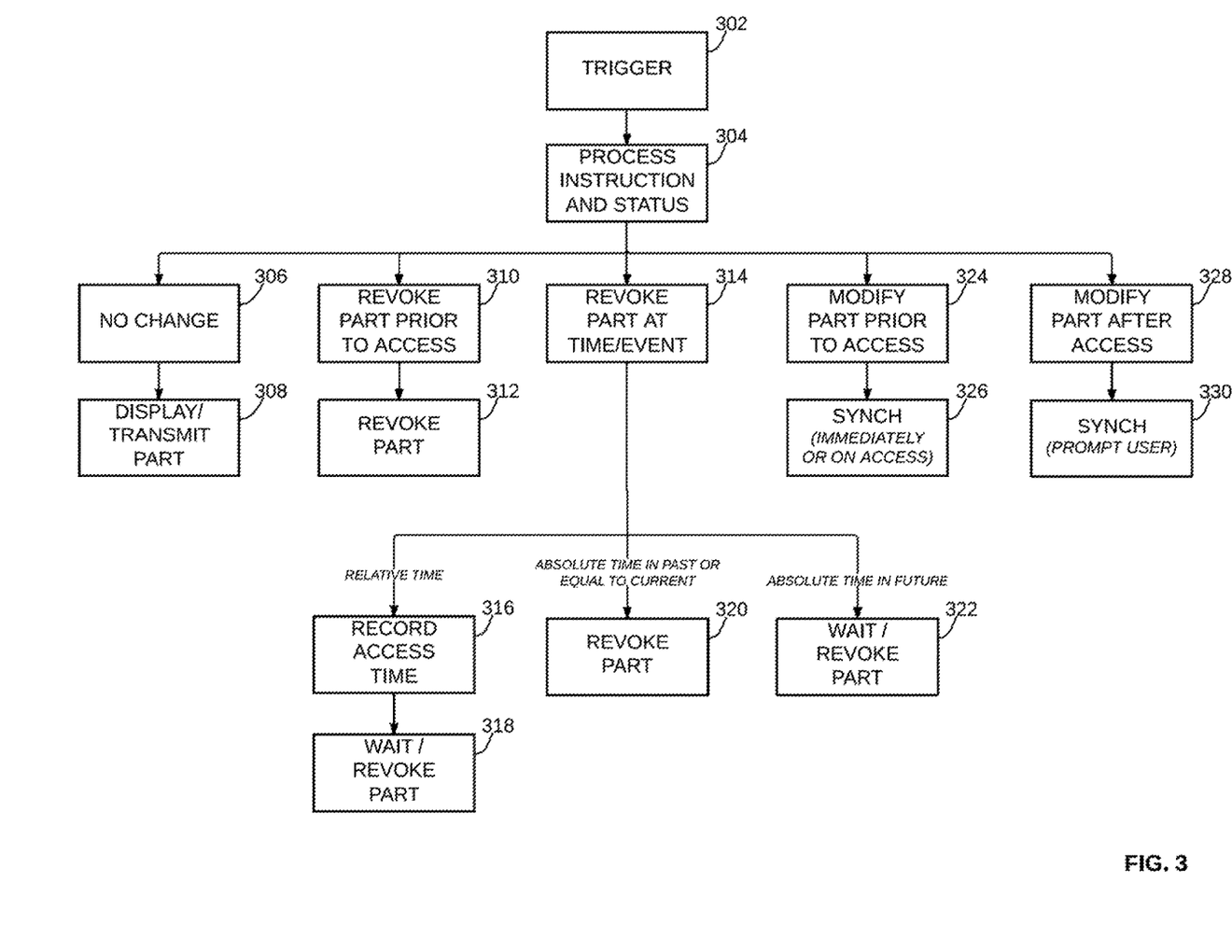
FIG. 3 illustrates a flow diagram of accessing a composite document content-part, according to an example of the present disclosure.

FIG. 3 illustrates a flow diagram of accessing a composite document content-part, according to an example of the present disclosure.

In block 302, in an example, a document author sets or creates a trigger, such as a modification or revocation in authoring environment 106 that is propagated to, for example, part location 124. A trigger may execute immediately, may be time-based, or may be event-based. In other examples, a trigger may be set by a workflow participant, or occur in response to a condition, occurrence, change, event, notification, or polling, etc. In some examples, triggers may only be created or edited by document authors or workflow participants with required levels of read/write access.

In block 304, in a first example, following a trigger, a handling instruction in a composite document and a status code from a part location are received, or retrieved, for a particular content-part. In another example, handling instruction and/or a status code may be embodied in or determined from a trigger. In an example, handling instructions and/or the status code may be used to determine an action.

For example, a status field 0 may indicate no change to a content-part; a status field 1 may indicate that a content-part is to be revoked prior to access by a workflow participant; a status field 2 may indicate that a content-part is to be revoked from a workflow participant at a particular time or upon a particular event; a status field 3 may indicate that a content-part is to be modified prior to access by a workflow participant; and a status field 4 may indicate that a content-part is to be modified after access by a workflow participant. Each of these five status fields or handling instructions are discussed below in more detail, along with an associated action. In addition, other status fields or codes may be used.

In block 306, a received handling instruction or status field, e.g., a code of 0, may indicate that no change is to be made to a content-part. In block 308, the content-part may be displayed or transmitted, or no action may be taken if, for example, a workflow participant already has an unchanged, transmitted content-part on the workflow participant's device.

In block 310, a received handling instruction or status field, e.g., a code of 1, may indicate that a content-part is to be revoked prior to access by a workflow participant. In such an example, the workflow participant may not have received or read a content-part, or may have received but not yet read the content-part. In either case, the content-part is revoked, i.e., the content-part is removed from composite document 108. In some cases, the content-part may only be revoked for a version of the content-part. For example, a document author may revoke version 5 of a document, but not revoke versions 1-4.

In block 314, a received handling instruction or status field, e.g., a code of 2, may indicate that a content-part is to be revoked based on a time, e.g., an absolute time or a relative time, or based on an event. In such an example, the workflow participant may not have received or read a content-part, or may have received but not yet read the content-part, or may have both received and read the content-part. In any case, the content-part is revoked, i.e., the content-part is removed from composite document 108, when a time or event is reached or occurred in blocks 316-322, as discussed below in more detail. As above, in some cases, the content-part may only be revoked from a version of the content-part. In some cases, a workflow participant may receive a warning with respect to an impending revocation.

In one example, in block 316, trusted access tool 120 determines that the datetime stamp handling instruction for composite document 108 is a relative time. A relative time may be, for example, a time of 20 minutes after the initial access of a content-part. Accordingly, trusted access tool 120 records the time the content-part was first accessed in block 316, and revokes the content-part in block 318 once the relative time period is elapsed or has been satisfied.

In another example, in block 320, trusted access tool 120 determines that the datetime stamp handling instruction for composite document 108 is an absolute time in the past, or a time matching the current time. Accordingly, flow proceeds directly to block 320, where the content-part is revoked.

In another example, in block 322, trusted access tool 120 determines that the datetime stamp is an absolute time in the future. Accordingly, trusted access tool 120 displays the content-part, if the content-part has been requested by a workflow participant and is not already displayed or transmitted, and waits for the datetime to be satisfied. When the datetime has been satisfied, e.g., when the time is reached, the content-part is revoked.

In the examples above, when a content-part is revoked, the content-part may be immediately revoked from a workflow participant, e.g., a workflow participant device, or in cases where a workflow participant is offline or not immediately available, a revocation command may be queued for execution when, e.g., a workflow participant device comes back online. In some examples, the participant access environment 118 may revoke a content-part if a workflow participant goes offline using, e.g., trusted access module 120. Revocation may also include securely wiping a disk drive area or sector associated with the revoked content-part, to increase security and privacy and ensure that the revocation cannot be reversed.

In block 324, a received handling instruction or status field, e.g., a code of 3, may indicate that a content-part is to be modified prior to access by a workflow participant. In such an example, the content-part may be synchronized in block 326, e.g., immediately, upon access by a workflow participant, or as soon as a workflow participant device is available or online.

In block 328, a received handling instruction, or status field, e.g. a code of 4, may indicate that a content-part is to be modified after access by a workflow participant. In such an example, the content-part may be synchronized in block 330. In such an example, as a workflow participant has already accessed the content-part and may be actively editing or reading the content-part, the content-part may be, in various examples, immediately modified, modified after warning a workflow participant and/or providing the workflow participant with a period of time before the content-part is modified, or asking the workflow participant if the modified version is desired.

Figure 4:
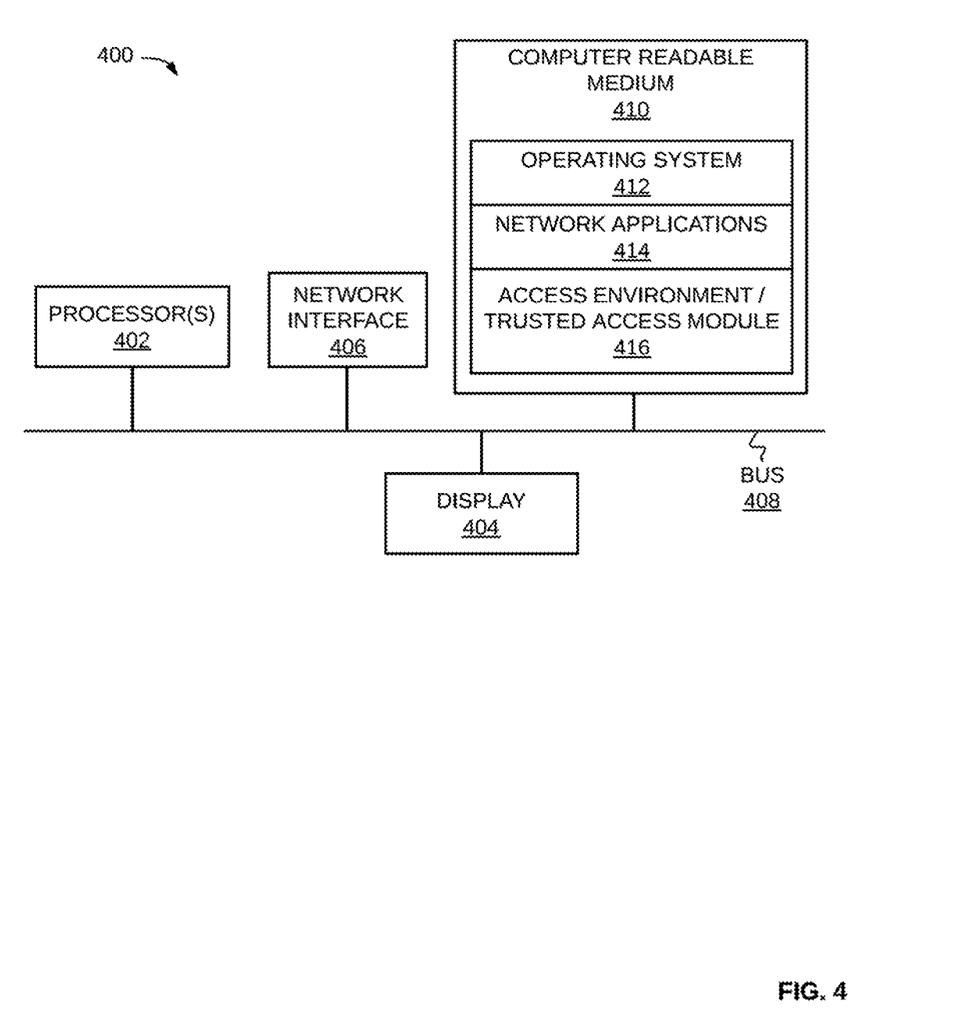
FIG. 4 illustrates a schematic representation of a computing device that may be used as a platform for implementing or executing at least one of the processes depicted in FIG. 3, according to an example of the present disclosure.

FIG. 4 illustrates a schematic representation of a computing device that may be used as a platform for implementing or executing at least one of the processes depicted in FIG. 3, according to examples of the present disclosure.

Some or all of the operations set forth in the figures may be contained as a utility, program, or subprogram in any desired computer readable storage medium, or embedded on hardware. In addition, the operations may be embodied by machine-readable instructions. For example, they may exist as machine-readable instructions in source code, object code, executable code, or other formats.

Computing device 400 may represent a computing device that comprises authoring environment 106, participant access environment 118, trusted access tool 120, and/or time engine 122. The device 400 may include a processor 402 such as a central processing unit; a display device 404, such as a monitor or other digital display; a network interface 406, such as a Local Area Network LAN card, a wireless 802.11x LAN card, a 3G or 4G mobile WAN or a WiMax WAN card; and a computer-readable medium 410. Each of these components may be operatively coupled to a bus 408. For example, the bus 408 may be EISA, PCI, USB, FireWire, NuBus, or PDS.

The computer readable medium 410 may be any suitable medium that participates in providing instructions to the processor(s) 402 for execution. For example, the computer readable medium 410 may be non-volatile media, such as an optical or a magnetic disk; and volatile media, such as memory. Transmission media can also take the form of acoustic, light, or radio frequency waves. The computer readable medium 410 may, also store other machine-readable instructions, including instructions downloaded from a network or the internet.

The computer-readable medium 410 may also store an operating system 412, such as Microsoft Windows, Mac OS, Unix, or Linux; network applications 414; and a secure content management application 416. The operating system 412 may be multi-user, multiprocessing, multitasking, multithreading, real-time, and the like. The operating system 412 may also perform basic tasks, such as recognizing input from input devices, such as a keyboard or a keypad; sending output to the display 404; keeping track of files and directories op medium 410; controlling peripheral devices, such as drives, printers, or image capture devices; and managing traffic on the bus 408. The network applications 414 may include various components for establishing and maintaining network connections, such as machine readable instructions for implementing communication protocols including but not limited to TCP/IP, HTTP, Ethernet, USB, and FireWire.

The authoring environment 106, participant access environment 118, trusted access tool 120, and/or time engine 122 may provide various machine readable instructions for managing access to secure content, as described above. In certain examples, some or all of the processes performed may be integrated into the operating system 412. In certain examples, the processes may be at least partially implemented in digital electronic circuitry, in computer hardware, in machine readable instructions (such as firmware and/or software), or in any combination thereof.

What has been described and illustrated herein are various examples of the present disclosure along with some of their variations. The terms, descriptions and figures used herein are set forth by way of illustration only and are not meant as limitations. Many variations are possible within the spirit and scope of the present disclosure, wherein the present disclosure is intended to be defined by the following claims, and their equivalents, in which all terms are meant in their broadest reasonable sense unless otherwise indicated.

What is claimed is:

1. A method of accessing a secure content-part of a composite document, said method comprising:
receiving, on a first computer, a trigger, wherein the trigger is to be activated based on a condition;
retrieving, on the first computer, a handling instruction for the content-part from the composite document upon activation of the trigger, wherein the handling instruction is determined from the trigger, wherein the handling instruction includes a datetime;
retrieving, on the first computer, a status for the content-part from a second computer;
determining, on the first computer, an action for the content-part based on the handling instruction and the status; and
executing, on the first computer, the content-part action, wherein, (i) in the event that the content-part action is to revoke the content-part, revoking the content-part as determined by the datetime, including securely wiping a disk area associated with the content-part, and (ii) in the event that the content-part action is to synchronize the content-part, synchronizing the content-part;
wherein the datetime includes a relative datetime or an absolute datetime, the relative datetime including a time after initial access of the content-part that is determined to be elapsed to revoke the content-part, the absolute datetime including a past or future time that is compared to a current time to revoke the content-part.

2. The method according to claim 1, wherein the synchronized content-part is an empty content-part.

3. The method according to claim 1, wherein the second computer stores at least one content-part.

4. The method according to claim 1, wherein the second computer stores at least one content-part status.

5. The method according to claim 1, wherein the first computer authenticates the handling instruction.

6. The method according to claim 1, wherein the first computer authenticates the status.

7. The method according to claim 1, wherein the handling instruction, as determined from the trigger, includes a content-part location, the method further comprising executing the content-part action based on the content part location.

8. The method according to claim 1, wherein the trigger is settable by an author of the composite document.

9. The method according to claim 1, wherein the trigger is settable by a workflow participant of the composite document.

10. The method according to claim 1, further comprising monitoring, at the first computer, for the condition, wherein the condition is based on one or both of a timing or an event associated with a participant.

11. A computer system with memory comprising:
a trusted access module to receive a handling instruction and a status for a composite document content-part upon activation of a trigger, wherein the trigger is to be activated based on a condition, wherein the handling instruction is determined from the trigger, wherein the handling instruction includes a relative datetime or an absolute datetime;
a time engine;
a secure disk wipe module; and
a participant access module to execute an action for the content-part based on the handling instruction, the status, and a time from the time engine,
wherein, in the event that the action is to revoke the content-part, the secure disk wipe module is to perform at least one stage of a disk wipe on a disk area associated with the content-part;
wherein if the handling instruction includes the relative datetime, the secure disk wipe module is to perform the at least one stage of the disk wipe on the disk area associated with the content-part at a time after initial access of the content-part as indicated by the relative datetime; and
wherein if the handling instruction includes the absolute datetime, the secure disk wipe module is to perform the at least one stage of the disk wipe on the disk area associated with the content-part when a current time reaches or passes the absolute datetime.

12. The system according to claim 11, wherein the trusted access module is to authenticate the handling instruction.

13. The system according to claim 11, wherein the trusted access module is to authenticate the status.

14. A non-transitory computer readable storage medium on which is embedded a computer program, said computer program to manage access to a secure content-part of a composite document, said computer program comprising a set of instructions to:
receive a trigger, wherein the trigger is to be activated based on a condition;
retrieve a handling instruction for the content-part from the composite document upon activation of the trigger, wherein the handling instruction is determined from the trigger, wherein the handling instruction includes a relative datetime or an absolute datetime;
retrieve a status for the content-part;
determine an action for the content-part based on the handling instruction and the status; and
execute the content-part action,
wherein, the content-part action comprises at least one of a revocation and synchronization command;
wherein if the handling instruction includes the relative datetime, the content-part action includes securely wiping a disk area associated with the content-part at a time after initial access of the content-part as indicated by the relative datetime; and
wherein if the handling instruction includes the absolute datetime, the content-part action includes securely wiping a disk area associated with the content-part when a current time reaches or passes the absolute datetime.

* * * * *